United States Patent
Poor et al.

(10) Patent No.: US 7,123,933 B2
(45) Date of Patent: Oct. 17, 2006

(54) SYSTEM AND METHOD FOR REMOTE APPLICATION MANAGEMENT OF A WIRELESS DEVICE

(75) Inventors: Graham V. Poor, Raleigh, NC (US); Margaret Mary Mahoney, Raleigh, NC (US)

(73) Assignee: Orative Corporation, San Jose, CA (US)

( * ) Notice: Subject to any disclaimer, the term of this patent is extended or adjusted under 35 U.S.C. 154(b) by 627 days.

(21) Appl. No.: 09/873,103

(22) Filed: May 31, 2001

(65) Prior Publication Data

US 2002/0183051 A1 Dec. 5, 2002

(51) Int. Cl.
*H04M 1/00* (2006.01)

(52) U.S. Cl. .............. 455/552.1; 455/414.1; 455/418; 455/419; 455/420; 455/557; 455/556.1; 701/33; 709/217

(58) Field of Classification Search ............. 455/456.1, 455/414.1, 517, 412.1, 418; 370/216, 242; 375/316, 219; 717/131, 127, 130
See application file for complete search history.

(56) References Cited

U.S. PATENT DOCUMENTS

| | | |
|---|---|---|
| 5,029,183 A | 7/1991 | Tymes |
| 5,084,877 A | 1/1992 | Netravali et al. |
| 5,222,061 A | 6/1993 | Doshi et al. |
| 5,327,554 A | 7/1994 | Palazzi, III et al. |
| 5,444,718 A | 8/1995 | Ejzak et al. |
| 5,457,680 A | 10/1995 | Kamm et al. |
| 5,465,401 A | 11/1995 | Thompson |
| 5,546,382 A | 8/1996 | Fujino |
| 5,564,070 A | 10/1996 | Want et al. |
| 5,598,534 A | 1/1997 | Haas |
| 5,664,091 A | 9/1997 | Keen |
| 5,673,322 A | 9/1997 | Pepe et al. |
| 5,742,668 A | 4/1998 | Pepe et al. |
| 5,742,905 A | 4/1998 | Pepe et al. |
| 5,790,536 A | 8/1998 | Mahany et al. |
| 5,809,415 A | 9/1998 | Rossman |
| 5,831,664 A | 11/1998 | Wharton et al. |
| 5,842,210 A | 11/1998 | Chen et al. |
| 6,014,429 A | 1/2000 | LaPorta et al. |
| 6,061,718 A | 5/2000 | Nelson |
| 6,076,113 A | 6/2000 | Ramanathan et al. |
| 6,112,323 A | 8/2000 | Meizlik et al. |
| 6,144,848 A * | 11/2000 | Walsh et al. ................. 455/419 |
| 6,167,253 A * | 12/2000 | Farris et al. ............. 455/412.2 |
| 6,202,008 B1 * | 3/2001 | Beckert et al. ................ 701/33 |
| 6,289,362 B1 | 9/2001 | Van der Meer |
| 6,298,039 B1 * | 10/2001 | Buskens et al. ............ 370/216 |
| 6,397,259 B1 | 5/2002 | Lincke et al. |
| 6,417,874 B1 | 7/2002 | Bodnar |

(Continued)

OTHER PUBLICATIONS

Class Bus, Copyright 2000, Damian Fauth, http://jsrvany.sourceforge.net/sourceforge/jsrvany/test/Bus.html.

*Primary Examiner*—Temica Beamer
*Assistant Examiner*—Joy Contee
(74) *Attorney, Agent, or Firm*—Courtney Staniford & Gregory LLP

(57) ABSTRACT

The invention links or associates commands supported by application programs in the wireless device or by the platform itself to remote devices or to other application programs or similar processes by means of a software mechanism referred to as a bus. The commands can be any that a user could initiate manually or that the platform could receive from a remote device or an application program or other process.

24 Claims, 11 Drawing Sheets

U.S. PATENT DOCUMENTS

| | | |
|---|---|---|
| 6,442,251 B1 | 8/2002 | Maes et al. |
| 6,457,879 B1 | 10/2002 | Thurlow et al. |
| 6,529,729 B1 * | 3/2003 | Nodoushani et al. ....... 455/419 |
| 6,567,416 B1 | 5/2003 | Chuah |
| 6,580,916 B1 * | 6/2003 | Weisshaar et al. ....... 455/456.1 |
| 6,584,564 B1 | 6/2003 | Olkin et al. |
| 6,590,588 B1 | 7/2003 | Lincke et al. |
| 6,600,930 B1 | 7/2003 | Sakurai et al. |
| 6,610,105 B1 | 8/2003 | Martin et al. |
| 6,628,965 B1 * | 9/2003 | LaRosa et al. ............... 455/557 |
| 6,654,428 B1 * | 11/2003 | Bose et al. .................. 375/316 |
| 6,658,409 B1 | 12/2003 | Nomura et al. |
| 6,658,654 B1 * | 12/2003 | Berry et al. ................. 717/131 |
| 6,681,110 B1 * | 1/2004 | Crookham et al. ......... 455/420 |
| 6,859,462 B1 * | 2/2005 | Mahoney et al. ........... 370/428 |
| 7,020,457 B1 * | 3/2006 | Poor et al. ................ 455/412.1 |
| 2002/0099753 A1 * | 7/2002 | Hardin et al. .................. 709/1 |

* cited by examiner

FIG. 7A

| | | | |
|---|---|---|---|
| Name | Stephen | | |
| Root | RootApp | | |
| Start | RootApp.Menu | | |
| App | RootApp | Welcome Stephen | Welcome to ToGo |
| | | | |
| App | RootApp.Menu | Main Menu | |
| Command | RootApp.Menu | LDAP | StartApplicationInfoName |
| Command | RootApp.Menu | Email | StartApplicationInfoName |
| Command | RootApp.Menu | Contacts | StartApplicationInfoName |
| Command | RootApp.Menu | Settings | StartApplicationInfoName |
| | | | |
| App | RootApp.LDAPSearch | LDAP | ToGo LDAP |
| Command | RootApp.LDAPSearch | Search | searchAddress |
| BusListener | RootApp.LDAPSearch | searchAddress | Search |
| Command | RootApp.LDAPSearch | Exit | StartApplicationInfoName |
| | | | |
| App | RootApp.LDAPList | LDAP | LDAP Search Results: |
| Command | RootApp.LDAPList | Open | openAddress |
| BusListener | RootApp.LDAPList | openAddress | Open |
| Command | RootApp.LDAPList | Back | StartApplicationInfoName |
| | | | |
| App | RootApp.LDAPRecord | LDAP | LDAP Record: |
| Command | RootApp.LDAPRecord | <<< | previousButton |
| BusListener | RootApp.LDAPRecord | previousButton | Previous |
| Command | RootApp.LDAPRecord | >>> | nextButton |
| BusListener | RootApp.LDAPRecord | nextButton | Next |
| Command | RootApp.LDAPRecord | Back | StartApplicationInfoName |
| Command | RootApp.LDAPRecord | Send Mail | sendMailAddress |
| BusListener | RootApp.LDAPRecord | sendMailAddress | sendEmail |
| Command | RootApp.LDAPRecord | Add To Contacts | addToContactsFromLdapAddress |
| BusListener | RootApp.LDAPRecord | addToContactsFromLdapAddress | addToContacts |
| App | RootApp.Settings | Settings | Settings |
| Command | RootApp.Settings | Save | saveAddress |
| BusListener | RootApp.Settings | saveAddress | Save |
| Command | RootApp.Settings | Cancel | StartApplicationInfoName |
| | | | |
| App | RootApp.EmailInbox | Email | Inbox: |
| Command | RootApp.EmailInbox | Get Mail | getMailAddress |
| BusListener | RootApp.EmailInbox | getMailAddress | GetMail |
| Command | RootApp.EmailInbox | Open | openAddress |
| BusListener | RootApp.EmailInbox | openAddress | Open |
| Command | RootApp.EmailInbox | Compose | StartApplicationInfoName |
| Command | RootApp.EmailInbox | Exit | StartApplicationInfoName |
| | | | |
| App | RootApp.EmailCompose | Email | |
| Command | RootApp.EmailCompose | Send | sendAddress |
| BusListener | RootApp.EmailCompose | sendAddress | sendMail |

SYSTEM AND METHOD FOR REMOTE APPLICATION MANAGEMENT OF A WIRELESS DEVICE

CROSS-REFERENCE TO RELATED APPLICATION

Co-pending application Ser. No. 09/873,123, filed May 31, 2001 entitled "SYSTEM AND METHOD FOR EXTENDING A WIRELESS DEVICE PLATFORM TO MULTIPLE APPLICATIONS," is related.

BACKGROUND OF THE INVENTION

1. Field of the Invention

The present invention relates generally to the execution of application programs on hand-held digital wireless data communication and computing devices of the types generally referred to as hand-held computers, personal digital assistants, cellular telephones, pagers and the like.

2. Description of the Related Art

A distinct category of electronic communication and computing devices increasingly referred to in the art simply as "wireless devices" is coalescing from the previously distinct fields of mobile computing and cellular telephony. The category includes devices commonly referred to as palmtop or hand-held computers, personal digital assistants, organizers, "smart" cellular telephones, pagers, and the like. Cellular and similar mobile telephones and telephone-like devices include computer application program-like functions, such as games, contact managers and e-mail. Personal digital assistants (PDAs) and other computer-like devices can include remote communication functions such as wireless networking for communicating e-mail and data. The convergence of wireless digital communication and mobile computing has given rise to wireless devices with substantial application program-like functionality.

There are presently few standards for wireless devices in the areas of operating systems and user interfaces. The operating systems of most wireless devices are proprietary to their manufacturers and thus not used in wireless devices produced by other manufacturers. Some wireless devices have user interfaces based upon a touch-screen display with which one can interact using a stylus or finger, while others have actual buttons a user can depress, and still others have a miniature alphanumeric keyboard on which a user can type. Wireless devices having various combinations of touch-screens and buttons are known. Display size and shape varies considerably among wireless devices. Of those having buttons, the style, placement and number of buttons varies considerably. In some devices, one uses directional buttons or joystick-like pucks to navigate among menu options or move a cursor on the screen, while in others one uses the touch-screen to perform such functions. Also, the mechanisms that wireless devices use to store and retrieve data in memory vary considerably. The differences among platforms are expected to increase, as new technologies emerge for user interfaces, data storage, communication and other functions. For example, wireless devices and similar platforms having a voice-based user interface instead of buttons and touch-screens have been suggested.

Differences among wireless device platforms (the term "platform" referring to the environment defined by the device hardware in conjunction with its operating system software) have frustrated third-party software developers' efforts to create application programs that are executable on more than one platform. To be executable on a specific platform, the program must properly interface with the buttons or other user interface inputs and the screen or other user interface outputs. For example, the application program must take into account the size and shape of the screen to ensure that information written to the screen appears in the intended position and format. Similarly, the program must properly interface with whatever mechanism the platform uses to store and retrieve information in memory and whatever mechanism the platform uses for network communication. An application program such as an e-mail client that is written to be executable on one platform will generally not be executable on another platform. Thus, if a software developer wishes to market an e-mail client application program, a different version must be written for each platform to whose users the developer wishes to market the program.

The advent of the JAVA language, promulgated by Sun Microsystems, Inc., has brought some limited uniformity to wireless devices. As illustrated in FIG. 1, a JAVA application program 12 can be written to execute on a wireless device having a JAVA virtual machine (JVM) software layer 14. JVM layer 14 resides on top of whatever native operating system software and hardware combination 16 characterizes the platform. Including JVM layer 14 that can execute JAVA application 12 can obviate writing a native application 18 that more directly executes on native operating system software and hardware combination 16. The difficulty of this approach to achieving cross-platform application program compatibility is that JVM layer 14 may not be the same across all platforms. The limitations on memory and power in wireless devices generally prevents including a full Java Virtual Machine implementation. Consequently, JVM layer 14 in some wireless devices may represent a more complete implementation of Sun Microsystems' JVM standard than in others. An application programmer cannot be certain that an application program written to take advantage of specific JAVA features will run on all platforms having JVM layer 14 because some platforms may support that feature and others may not. In an effort to remedy this problem, an industry standards committee developed the Connected Limited Device Configuration (CLDC) and Mobile Information Device Profile (MIDP) specifications. Including CLDC and MIDP layers 20 provides a limited but standardized JAVA environment for which programmers can write applications 22 that will work on all such devices.

Another limitation of wireless devices is that their operating systems do not provide mechanisms for readily switching from one application program to another or allowing application programs to share components. Wireless device application programs are generally self-contained in the sense that they do not share components. Operating systems for personal computers, such as MICROSOFT WINDOWS, include sophisticated methods such as the dynamically linked library (DLL) for juggling application programs, sharing software components, and similar interrelated operating system tasks, but the memory and power limitations of wireless devices generally inhibit use of such methods. Thus, wireless devices typically use the simplest of methods for launching and controlling the execution of programs. For example, activating a button (either an actual pushbutton or a graphical button appearing on a display) may cause a program to begin executing. The program may present output to the user in the form of screen displays and receive input from the user in the form of button activations. When the program has finished executing or at such other time as the user desires, the user can lauch and interact with another program in the same manner. Each program is, in essence, a self-contained block of software code, and only one program is executable at a time.

A user is not only limited as described above in the ways in which programs in a wireless device can be switched between, started and stopped, but a user is similarly limited in the ways in which programs can be installed, un-installed, updated, initialized and similarly managed in a wireless device. For example, a user can typically install new application programs only by connecting the wireless device to a network server or a personal computer through a network connection or other interface. It is common to download programs from an Internet server. In the case of most wireless devices, the user must perform the steps necessary to effect the download, installation, initialization or other task. In at least one case, a mobile telephone, a remote entity can initiate limited tasks such as enabling or disabling an application in the phone.

It would be desirable to free wireless device users from application management tasks such as installing, un-installing, initializing, enabling and disabling. The present invention addresses these problems and deficiencies and others in the manner described below.

SUMMARY OF THE INVENTION

The present invention relates to controlling and managing application programs in digital devices, including personal digital assistants, mobile telephones, pagers and the like. The invention links or associates commands supported by application programs in the wireless device or by the platform itself to remote devices or to other application programs or similar processes by means of a software mechanism referred to as a bus. The commands can be any that a user could initiate manually or that the platform could receive from an application program or other process. As examples, a remote device can transmit commands to the wireless device to install a program, uninstall a program, initialize a program, enable a program, disable a program, start (i.e., run) and stop a program, update a program, replace a program, monitor program usage, monitor network impact, configure and reconfigure the application program set in the wireless device, and perform any command supported by any application program in the device. Thus, if an application program in a wireless device is responsive to a button activation, for example, by invoking a method, that same method can be invoked in response to a command received from a remote device or another application program or similar process. Similarly, if there is a framework method that can be invoked in response to another event, that same method can be invoked in response to a command received from a remote device, application program or other process. In the illustrated embodiment of the invention, the software bus is included in an object framework layer in the device and responds to a remote device writing to an address on the bus by invoking a corresponding method in an application program or the framework itself. The remote device can be a computer, another wireless device, or any other suitable device.

It is to be understood that both the foregoing general description and the following detailed description are exemplary and explanatory only and are not restrictive of the invention, as claimed.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIG. 7A is a portion of an exemplary control file;

DETAILED DESCRIPTION

Figure 1:
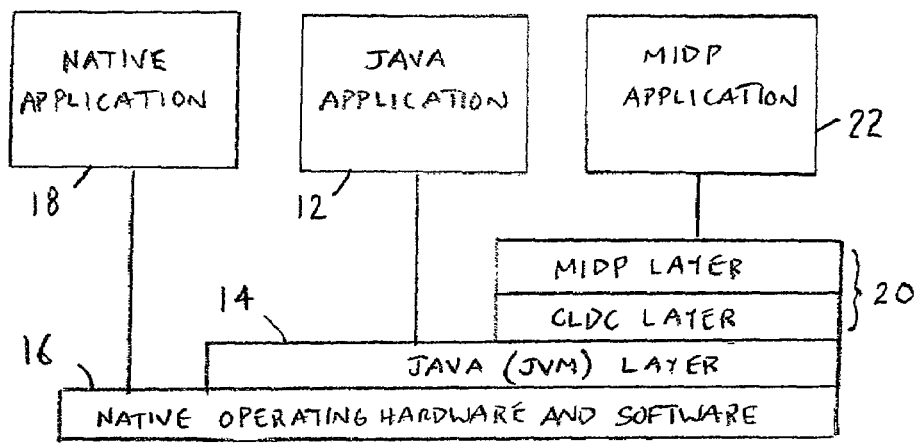
FIG. 1 illustrates wireless device platform layers known in the prior art.
Figure 2:
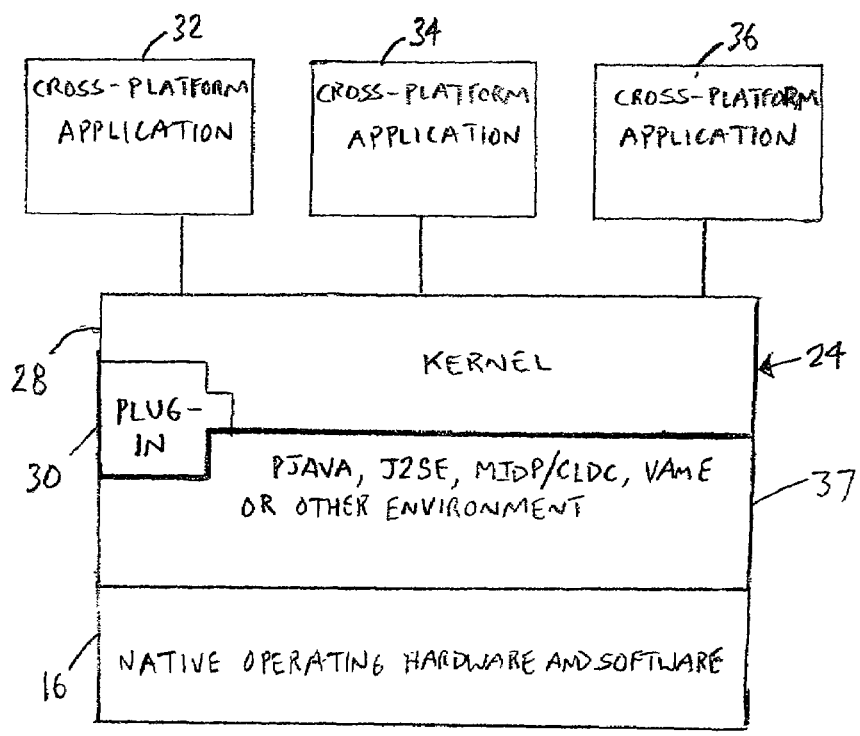
FIG. 2 illustrates exemplary wireless device platform layers in accordance with the present invention.
Figure 3:
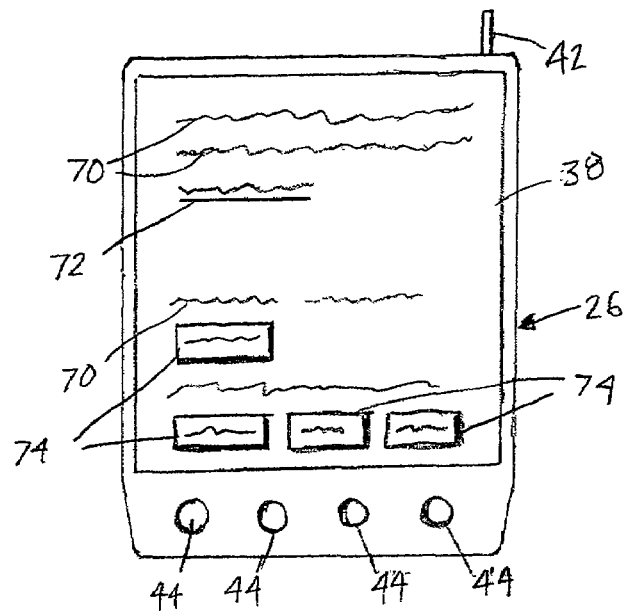
FIG. 3 is a top view of an exemplary PDA-like type of wireless device in accordance with the present invention.

As illustrated in FIG. 2, a framework or collection of object classes 24 resides, in the illustrated embodiment of the invention, in an electronic digital device 26 (FIG. 3). Framework 24 includes kernel classes 28 and plug-in classes 30, described in further detail below. Framework 24 is a layer of software that conceptually resides between the native operating hardware and software 16 and application programs 32, 34 and 36, in effect providing an interface between them. (There is no significance to the depiction of three such application programs 32, 34 and 36 other than to illustrate that more than one, i.e., a plurality, can reside in device 26 simultaneously.)

The term "object" is used in this patent specification in the context of object-oriented programming (OOP), with which persons skilled in the art to which the invention relates are familiar. Among the relevant OOP concepts are that the work that is done when the software is executed is done by objects, and that objects encapsulate both methods and data and can communicate with each other through their interfaces. Programmers define classes by writing software code in an OOP language such as JAVA. When software is executed, objects are instantiated; an object is an instance of a class. It is contemplated that framework 24 be written in JAVA or a similar language. JAVA may provide some advantages over other languages presently known in the art, but other languages presently known and that will likely be developed are suitable.

One of the advantages of the invention is that it allows each of application programs 32, 34 and 36 ("applications") to be written and to operate in a device-independent manner. In other words, the application programmer need not create one version tailored to the platform-defining characteristics of device 26 and another version tailored to the characteristics that define some other platform. Each of application programs 32, 34 and 36 will operate in essentially the same manner regardless of the platform onto which it is loaded.

Figure 4:
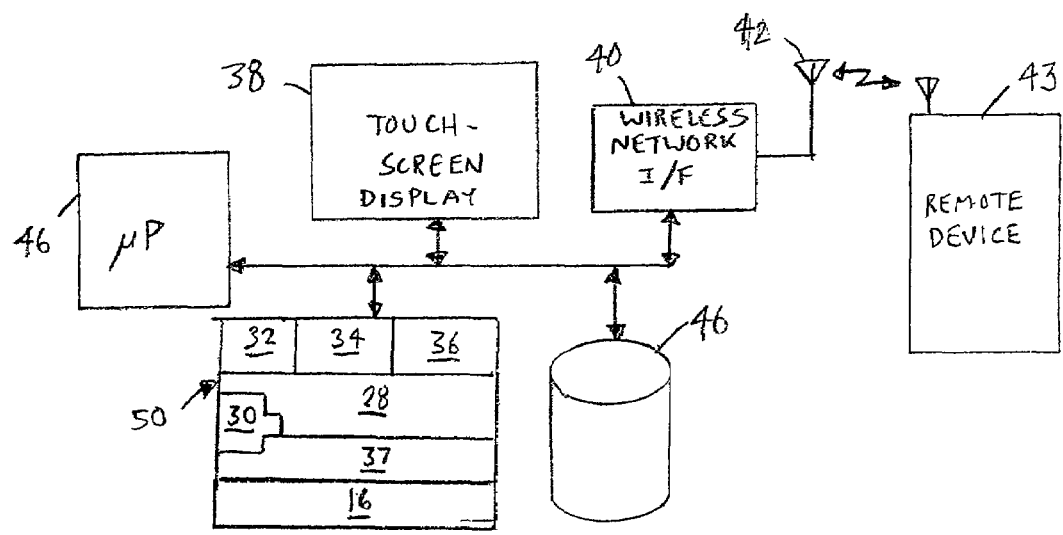
FIG. 4 is a block diagram of the elements of the wireless device of FIG. 3.

The term "platform" refers to the total hardware and software environment in which application programs 32, 34, and 36 operate. The platform is thus defined by the combined effect of native operating hardware and software 16 and any other operating environment 37. (In the illustrated embodiment of the invention represented by device 26, operating environment 37 is a software layer existing between native operating hardware 16 and framework 24, but in other embodiments such a layer may not exist or may be different.) For example, as illustrated in FIGS. 3 and 4, a hand-held device commonly referred to as a wireless personal digital assistant (PDA) may resemble device 26 in that it includes: a touch-screen display 38, a wireless network interface 40 (note antenna 42) for communicating with a remote device 43, some pushbuttons 44 and a storage subsystem 46. All of these are elements of native operating hardware and software 16. The combined effect of these elements and any other operating software elements, such as environment 37, is what defines the platform; changing any one of these elements results in a different and distinct platform. If, for example, instead of touch-screen display 38 and buttons 44 as the primary elements of the user interface there were a voice-recognition and voice synthesis-based user interface, persons skilled in the art would consider the platform to be entirely different and distinct. Moreover, even if native operating hardware and software 16 of device 26 were identical to those of another device (not shown), but device 26 were to include a MIDP/CLDC operating environment 37 whereas the other device included a J2SE environment, persons skilled in the art would consider the platforms to be entirely different and distinct. Indeed, the term "platform" is often used more loosely in the art to refer to operating environment 37 alone. For example, one may refer to a certain brand of PDA as being a "J2SE platform." In addition to MIDP/CLDC, there are a number of other types of operating environments 37 that are well-known alternatives for PDAs such as device 26, including Sun Microsystems' persistent JAVA (pJAVA), IBM's Visual Age Micro Edition (VAME), JAVA 2 Platform Standard Edition (J2SE), and kAWT (kJAVA-environment flavor of Sun Microsystems' Abstract Window Toolkit (AWT)). Likewise, in embodiments of the invention in which the device more closely resembles a mobile telephone, environments comprising similar alternatives are known. In accordance with the present invention, an application program operates in essentially the same way from the perspective of a user, regardless of what type of user interface, storage mechanism or network protocol is provided by the native hardware and software of the device on which it is loaded, regardless of whether the native hardware and software make the device seem more PDA-like, phone-like, pager-like, or more like something else, and regardless of what type of operating environment software layer the device may have.

In FIG. 4, all of the software elements described above with regard to FIG. 2 are conceptually illustrated as residing or stored in a memory 50 so that they can be operated upon under control of microprocessor 46. Nevertheless, they are shown in this manner for purposes of illustration only; persons of skill in the art will appreciate that, in accordance with the well-known manner in which computers and similar devices of the type to which the invention pertains manage their software elements, not all such elements need reside simultaneously or in their entireties in memory 50. Likewise, there may be additional software elements in memory 50 that are not shown for purposes of clarity. Note that memory 50 represents a working memory of the type from which executable software is conventionally executed in such devices, and storage subsystem 46 is a memory of the type in which application programs typically store files and similar data. Nevertheless, in other embodiments of the invention, there may be no distinction between these two types of memory or, conversely, they may be distinct from an application program's perspective but physically embodied in the same hardware. Storage subsystem 46 is analogous to disk drive memory in a desktop computer, but in device 26 it is contemplated that it be physically embodied in solid-state memory rather than a disk to maximize reliability and economize on the overall size of device 26, which, like any conventional PDA, is intended to be small enough to hold in a user's hand.

"Plug-in" classes 30 are so termed because they can be easily added to kernel classes 28 to adapt kernel classes 28 for a specific platform. The concept of a software "plug-in" is well-understood in the art and is common in software such as web browsers, where different users may prefer to include different capabilities. The concept applies in the present invention because a manufacturer of device 26 prefers to take advantage of the capabilities of that platform, which inherently differ from those of a different platform. For example, a first set of plug-in classes 30 may be added to kernel classes 28 in embodiments of the invention in which the platform is J2SE-based, a second set may be added in embodiments in which the platform is VAME-based, a third set may be added in embodiments in which the platform is defined by a voice-based user interface instead of a more typical touch-screen based user interface, and so on. In other words, it is contemplated that a uniform set of kernel classes 28 will be provided in any commercial embodiments of the present invention, and that new sets of plug-in classes 30 will be developed as new platforms become commercially available. The present invention thus allows existing application programs 32, 34, 36, etc., to operate properly on a newly developed platform by installing the corresponding set of plug-in classes 30 for that platform. Each platform has its own corresponding set of plug-in classes 30 but the same set of kernel classes 28 as other platforms.

Application programs 32, 34 and 36 interface with native operating hardware and software 16 of device 26 through a suitable application program interface (API) (not shown) implemented by framework 24. In accordance with the cross-platform operability concept described above, a uniform set of API functions are included in framework 24 without regard to the platform in which framework 24 is installed. An application program that uses the API will run properly on any platform.

Figure 5:
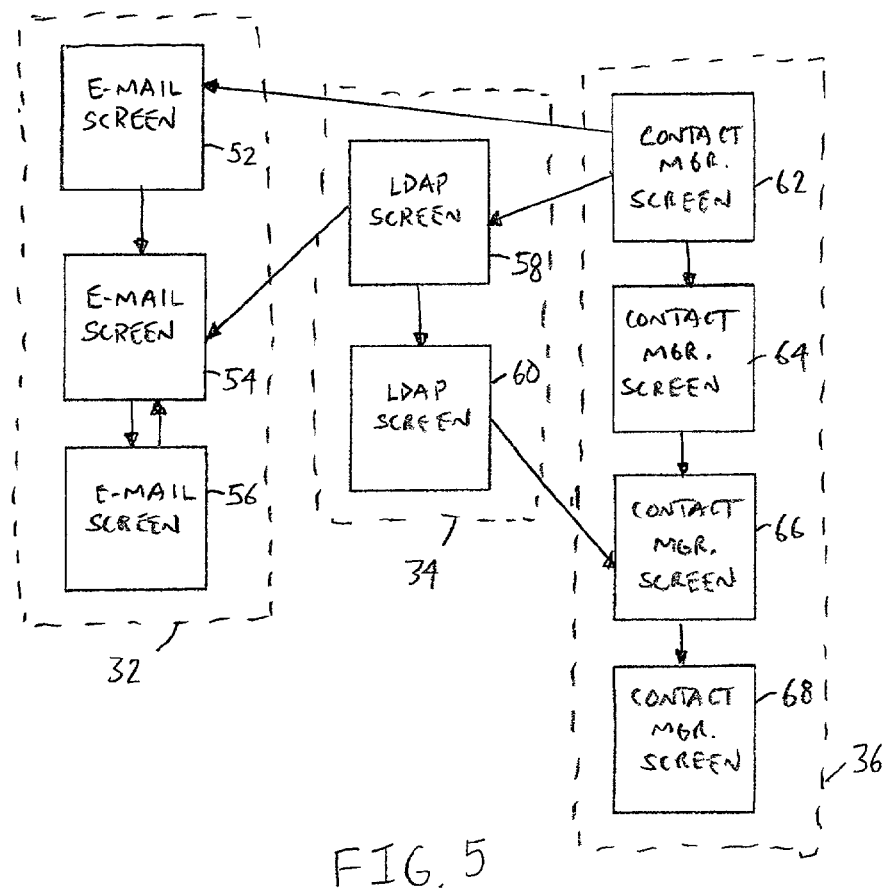
FIG. 5 illustrates an example of the linkage of application program screens to one another in accordance with a control file.

An application program (32, 34, 36, etc.) can be conceptually structured as a group of screens through which a user navigates. As illustrated in FIG. 5, application program 32 can be, for example, an e-mail client, and considered to comprise the screens 52, 54 and 56; application program 34 can be, for example, a directory program based upon the lightweight directory access protocol (LDAP), and considered to comprises the screens 58 and 60; and application program 36 can be, for example, a contact manager, and considered to comprises the screens 58 and 60. These are well-known application program functions and mentioned only as examples, and application programs 32, 34 and 36 can be of any other suitable type, such as a web browser.

An advantage of the present invention is that application programs 32, 34 and 36 can be integrated with one another to an extent greater than known in the prior art. The arrows within each of application programs 32, 34 and 36 represent the sequence or sequences in which a user can navigate from screen to screen. The number of screens and the arrangement of the arrows shown in FIG. 5 are not significant and intended for illustrative purposes only. An application program may have few screens or many screens associated with it. The term "screen" refers to what is displayed for the user on touch-screen display 38 (FIG. 3). In device 26 the user interface is a graphical user interface (GUI) along the lines of that which is common in some PDAs, mobile phones and similar digital devices. Accordingly, examples of some of the types of text, graphics, images, windows and icons that can be displayed by this GUI are shown in FIG. 3. A screen can include, for example, some text 70, some of which may represent a hyperlink 72 or other hot or active text of the type conventionally displayed by web browser application programs. A screen can similarly include, for example, buttons 74. As in conventional application programs having graphical user interfaces, buttons 74 are graphical representations of user interface control inputs and resemble actual or physical buttons in appearance. As well-known in the art, a user can activate or press button 74 by touching that area of touch-screen display 38.

As used in this patent specification, the phrase "activation of a user interface control" and similar language refers to any suitable type of user action responsive to a user input control, including pressing (actual) button 44, touching (virtual or graphical) button 74 or other graphical user interface control such as hyperlink 72, an icon, scroll bar, menu option, pull-down tab, or other active graphical feature. The term "control" or "graphical user interface control" is commonly used in the art to refer to all such active graphical features. The selection or activation can include actually touching the user interface control in touch-screen embodiments of the invention, pressing an actual button in other embodiments, speaking a voice command in still other embodiments, and any other suitable type of user input response known in the art.

The novel integration of application programs 32, 34 and 36 with each other is represented by the arrows in FIG. 5 that cross from one to another. For example, a user interacting with screen 58 associated with the directory application program 34 can cross over to screen 54 associated with the e-mail application program 32. In other words, display 38 changes from displaying screen 58 to displaying screen 54. Such a screen change can be effected in response to the user activating a button or other graphical user interface control on screen 58. In this example, the cross-over from application program 34 to application program 32 is transparent to the user, who need not be aware of exactly which of application programs 32, 34 and 36 is executing at any given time.

Figure 6A:
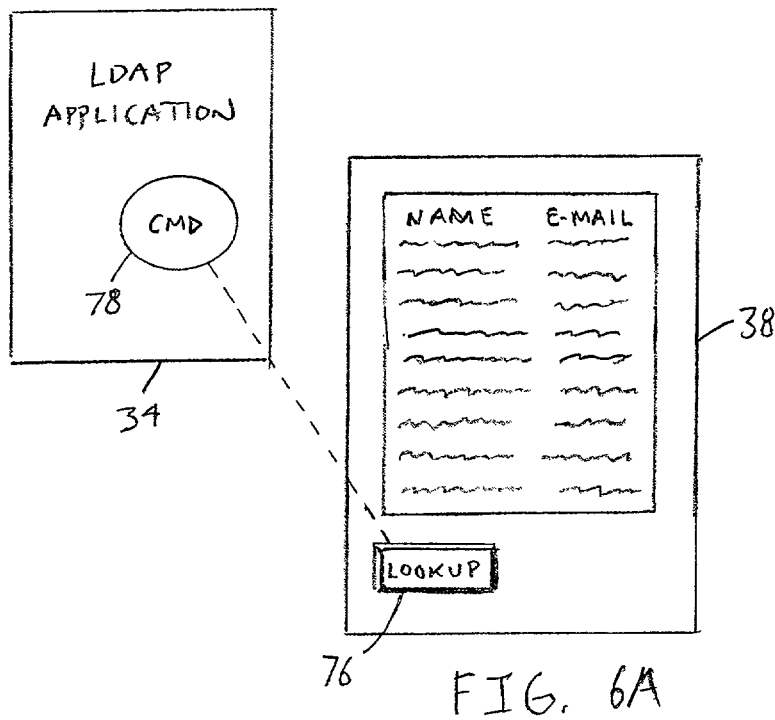
FIG. 6A illustrates an example of linkage of a button to an application program command.
Figure 6B:
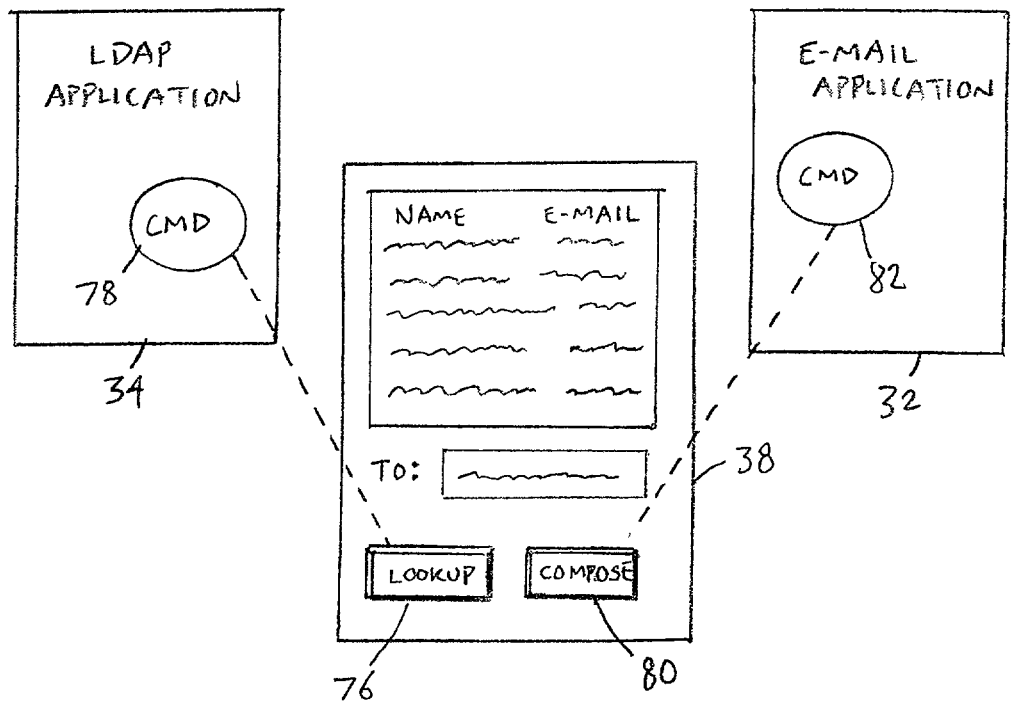
FIG. 6B is similar to FIG. 6A and illustrates the effect of the addition of another application program.

For example, as illustrated in FIG. 6B, directory application program 34 can cause a screen to be displayed with a button 76 labeled "LOOKUP," the activation of which by a user causes a command 78 associated with directory application program 34 to be performed. Command 78 may, for example, cause another screen to be displayed with a list of names and corresponding e-mail addresses. A user can select a name (e.g., by touching it). If the user then activates a button 80 labeled "COMPOSE," a command 82 associated with e-mail application program 32 is performed that causes another screen to be displayed in which the e-mail address corresponding to the selected name has been inserted into a box labeled "TO:_____."

Figure 7B:
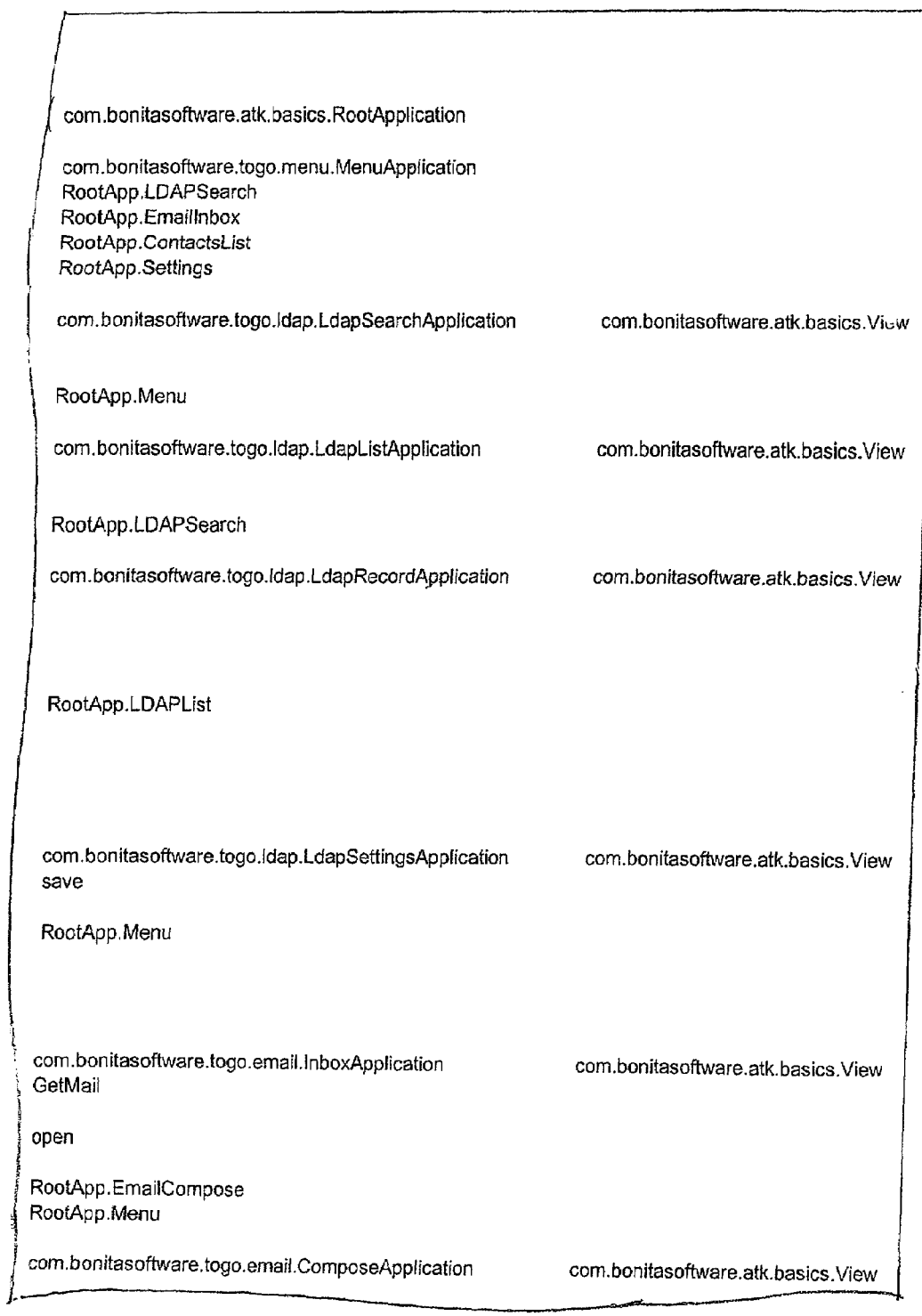
FIG. 7B is a continuation of FIG. 7A.

The integration between application programs 32 and 34 in the example described above is achieved through the use of a control file such as that of which a portion is illustrated in FIGS. 7A and 7B. The illustrated portion of the control file has six columns, the first four being shown in FIG. 7A and the final two being continued in FIG. 7B. The meanings of the elements in the columns are described in detail below, but note that some of the element names include references to "LDAP," i.e., the directory function, and others include references to the "e-mail" function. In the example described above in which device 26 includes application programs 32, 34, and 36, the cornrol file would include references not only to the e-mail and directory functions but also the contact manager function represented by the application program 36. The control file can be created using any suitable authoring means, such as a text editor or a spreadsheet program, and the fields can be delimited in any suitable manner such as columns or separating elements with commas or other characters. The control file is loaded into device 26 in essentially the same manner as application programs 32, 34, and 36. As described below, the control file controls how the screens are arranged, what buttons or other user interface controls are displayed, how they are labeled, and the JAVA method associated with each user interface control.

Figure 8:
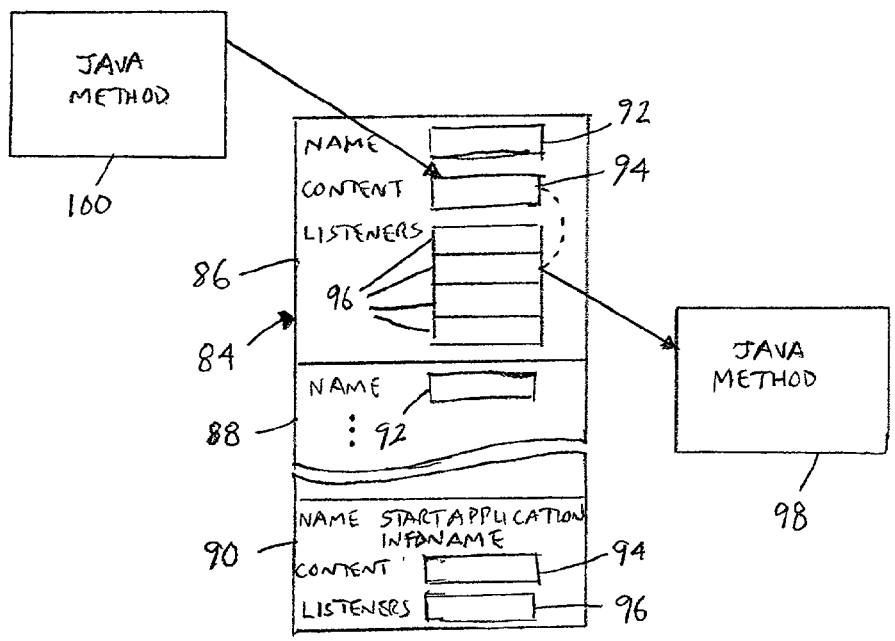
FIG. 8 illustrates the software bus that links button presses and similar input activations to application program methods.
Figure 9:
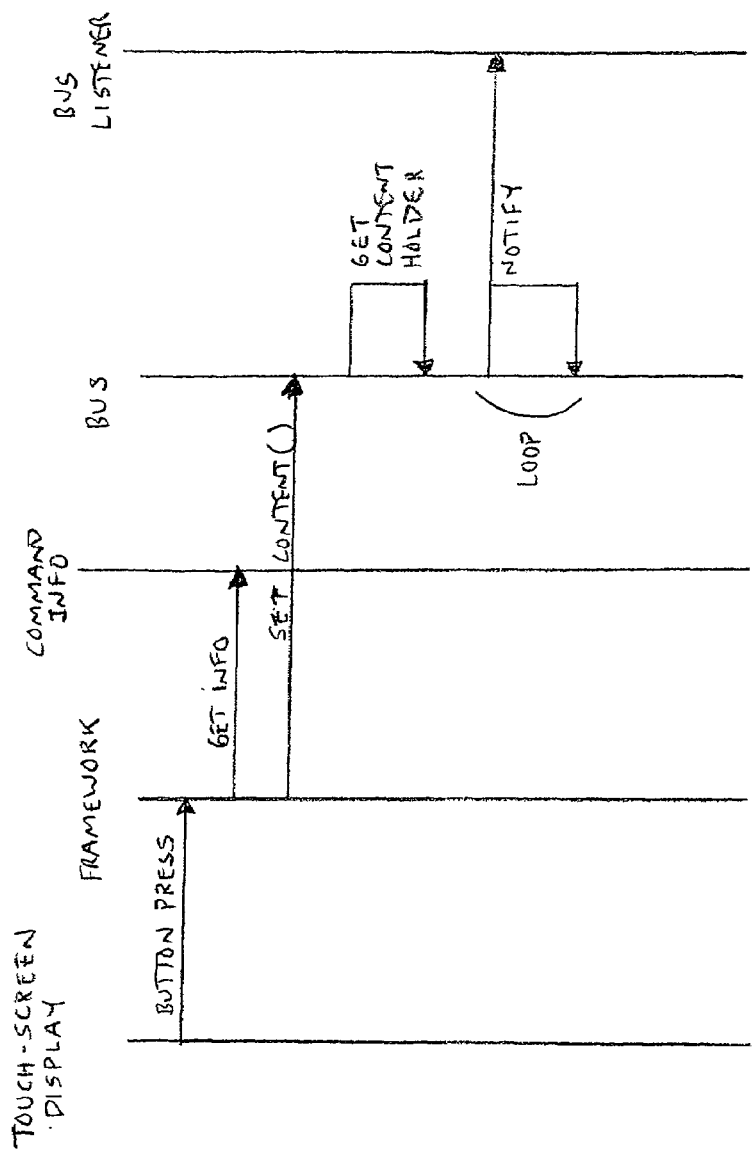
FIG. 9 is a sequence diagram illustrating the sequence of events with respect to the operation of the bus in response to a button press.

The manner in which the activation of a user interface control results in the performance of a command is illustrated in FIGS. 8 and 9. As illustrated in FIG. 8, the concept centers around an object structure referred to in this patent specification as a "bus" 84. Like a hardware bus of the type commonly referred to in the context of computer hardware as a control bus (other types of such busses being address, data and power busses), bus 84 performs the control bus-like function of, in a generalized sense, allowing one participant on the bus to transfer control to another. Unlike a computer hardware bus, bus 84 is implemented in software. While the concept of a software bus is in and of itself well-known in the art, in the context of the illustrated embodiment of the invention, bus 84 is a collection of content holders 86, 88, 90, etc., each having a name 92 that represents a bus address, a content 94, and one or more bus listeners 96. Bus 84 and its elements can be defined by a suitable JAVA class structure. Although a complete content holder 86, a portion of a second content holder 88, and a third content holder 90 are shown for purposes of illustration, there can be any suitable number. Each bus listener 96 corresponds to a JAVA method 98 associated with one of application programs 32, 34 and 36 or with framework 24 itself. Each command is performed by invoking one or more JAVA methods 98. For purposes of clarity, only one method 98 is illustrated in FIG. 8.

Other JAVA methods 100 in framework 24 respond to the activation of user interface controls by writing values to the addresses referred to as "content" 94. The activation of a specific user interface control results in the writing of a value to a content 94 of one content holders 86, 88, 90, etc. The value depends upon the command associated with the user interface control and the state of the program. For example, the value can be an e-mail address in the case of the example described above in which the user activates "COMPOSE" button 80 (FIG. 6B). One of content holders 86, 88, 90, etc.

detects that the value stored in its content 94 (which is an address) has changed and, in response, notifies each of its one or more bus listeners 96. Each of bus listeners 96 has an address and a JAVA method 98 associated with it. In response to the notification, each bus listener calls or invokes the JAVA method 98 associated with it. FIG. 9 is a sequence diagram representing the above-described operation.

Content holder 90 has a different name ("StartApplicationInfoName") from other content holders 86, 88, etc., because their bus listeners 96 are created by and associated with the application program then executing, whereas bus listener 96 of content holder 90 is created by and associated with framework 24 itself. This framework bus listener 96 responds to a change in content 94 by invoking a JAVA method 98 having a name that is the same as the value to which content 94 changed. The JAVA method 98 is associated with a different application program 32, 34 or 36 from the one that had been executing. This important mechanism is the means by which activating a button or other user interface control associated with or linked to a method associated with a first application program causes a method associated with a second application program to be invoked. The bus concept allows device 26 to in effect switch from executing one application program 32, 34 or 36 to another, transparently to the user, because it makes any JAVA method 98 of any loaded application program accessible from any other loaded application program 32, 34 or 36. The bus concept removes the boundaries of application programs by treating the set of loaded application programs 32, 34 and 36 as a single superset of their JAVA methods 98. Note that not only object methods of application programs 32, 34 and 36 but also any remote devices and servers (not shown) that can communicate with device 26 can be allowed to participate or write data to a bus address controlled as described above.

Returning briefly to FIGS. 6A and 6B, note that the composition of the screens depends upon the combination of application programs that are loaded and the control file that defines how those application programs are integrated. For example, assume the only application that is present in device 26 is directory application program 34, as illustrated in FIG. 6A. The control file defines a screen that includes only a "LOOKUP" button 76. Activating button 76 causes a list of names and addresses, such as street addresses or e-mail address, and perhaps other information, to be displayed. Selecting an item from the list can cause other information relating to that name to be displayed, such as a telephone number, but no other user interface controls are displayed because the only function of application program 34 (at least in this simple example) is to display such information. If e-mail application program 32 is then added to device 26, such that device 26 includes both directory application program 34 and e-mail application program 32, a different screen can be defined. Instead of the screen (FIG. 6A) that includes only "LOOKUP" button 76, a screen that includes both "LOOKUP" button 76 and "COMPOSE" button 80 can be displayed, as illustrated in FIG. 6B. As explained above, the buttons or other user interface controls that are included in screens and the manner in which they are associated with JAVA methods to effect commands associated with the user interface controls is defined by the control file. In the exemplary scenario described above, a new control file is loaded that defines such a screen with both button 76 and button 80 and links them to their associated commands.

Although not necessarily so, it is contemplated that a control file be loaded into device 26 contemporaneously with the loading of a set of application programs into device 26, the removal of one or more application programs from device 26, or any other change in the combination of application programs loaded. Thus, as illustrated in the flow diagram of FIG. 10, a set of one or more application programs and a control file that integrates them are loaded into device 26 at step 102. They can be downloaded from a remote source (not shown) via the wireless network connection or loaded or installed in any other suitable manner. At step 104, when a user runs the programs, framework 24 reads the control file and uses the information to control the screen displays and effect the JAVA methods associated with user interface control activations, as described in further detail below. At step 106, a new set of application programs and a control file that integrates them are loaded. The step of loading a "new" set is intended to encompass adding one or more application programs to the then-loaded or existing set, removing one or more application programs from the existing set, substituting a new set for the existing set, and any other changing of the combination of loaded application programs. Likewise, loading a "new" control file means updating the control file in any manner, whether replacing an existing one or modifying it. The new control file can integrate the newly loaded application program with any that have been loaded previously, thereby introducing new screens with new combinations of user interface controls associated with the JAVA methods of the newly installed application. (See step 108.) In the above-described example of loading e-mail application program 32 into device 26 when it included only an existing directory application program 34, from the perspective of the user of device 26 the directory lookup function gained an e-mail capability or, alternatively, the new e-mail function retained the directory lookup function. Moreover, note that the sequence of screens, the user interface controls displayed on those screens, and the methods invoked by activating those user interface controls can be changed by simply updating a control file (e.g., replacing an existing control file with a new one). From a user's perspective, he is presented with a seemingly different GUI without the application programs themselves having changed.

Figure 10:
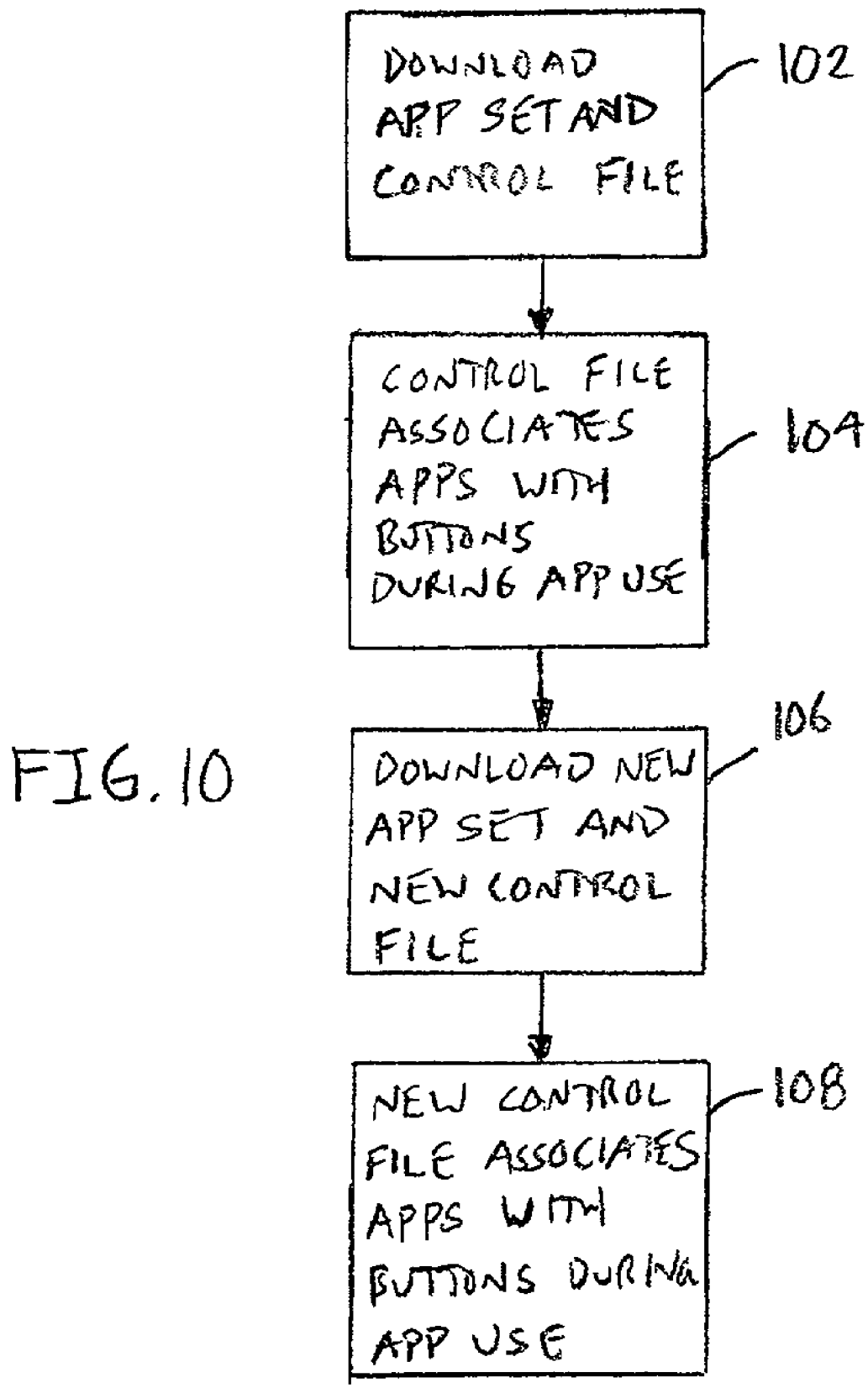
FIG. 10 is a flow diagram illustrating the process of altering the application program set installed in the device.

With regard to FIG. 10, it is contemplated that each of application programs 32, 34, 36, etc. be loadable at any suitable time, including at the time a user requests to run it. In other words, a home screen or root screen (not shown) can display, for example, icons representing a menu of application programs 32, 34 and 36, but they may not all yet actually be installed in device 26. If a user selects a program (e.g., by touching or otherwise activating it's icon on display 38) that is not yet loaded, device 26 can transmit a request to a remote server (not shown) to download it. The program is executed immediately upon downloading. From the user's perspective, any of programs 32, 34, 36 is immediately available for use, regardless of whether it has actually yet been loaded or installed in device 26. The control file is that is downloaded along with the requested program is customized to integrate the combination of programs that will then have been installed. To determine the combination of programs installed on a certain user's device 26 at any given time, the remote server can query the user by prompting the user to identify all programs then installed on his device 26. Alternatively, the remote server can maintain a database of users and the programs they have installed, updating the database each time a user requests an additional program or deletes a program.

Figure 11:
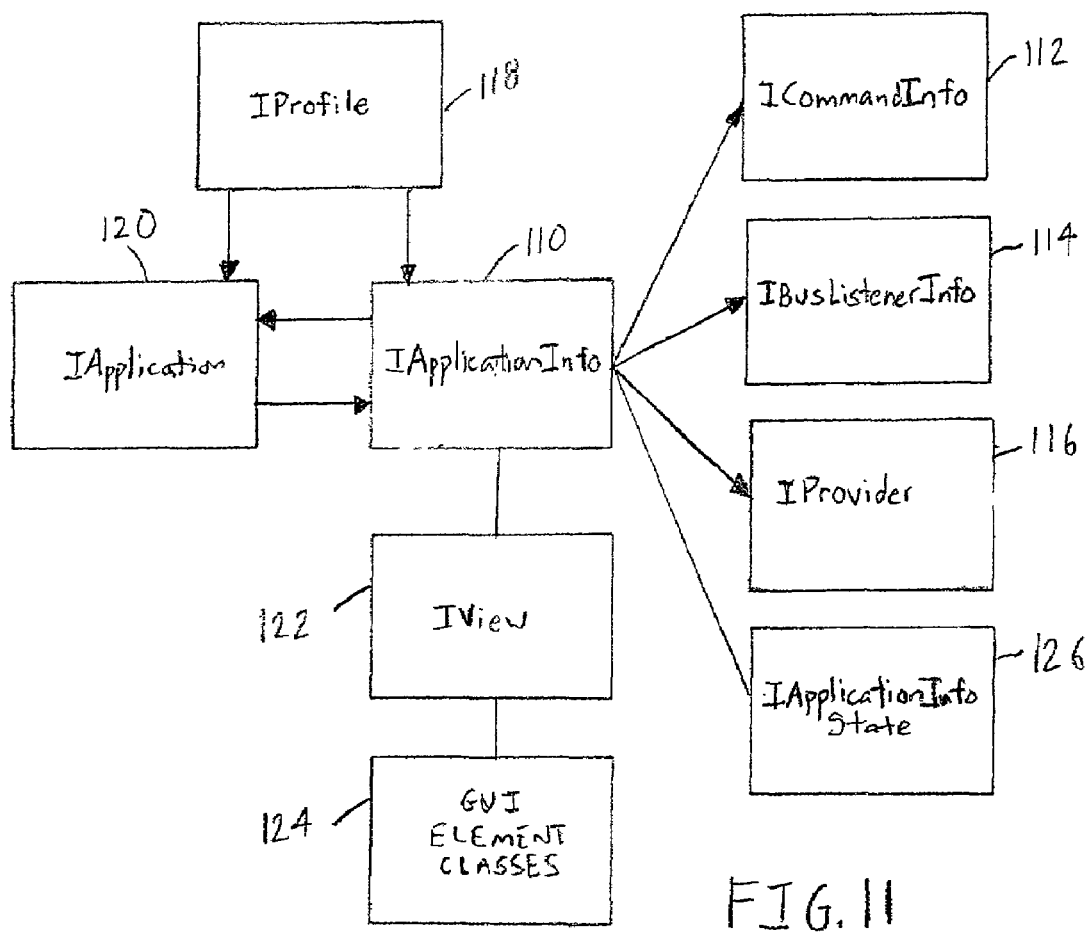
FIG. 11 is an object class diagram of the major classes involved in interacting with the user interface of the device.

Although the sequence of operation is described in further detail below, when device 26 is initialized by the user by turning it on, logging in, resetting it, or by a similar system startup action, objects are instantiated in accordance with the control file and classes defined by framework 24. Some of these framework classes are shown in the class diagram of FIG. 11. Persons skilled in the art will note that the class names begin with the letter "I" to denote JAVA interface classes rather than implementation classes. IApplicationInfo class 110 represents a single screen. Components of class 110 can be read from a configuration file (not shown in FIG. 10) at startup. Class 110 refers to an ICommandInfo class 112, an IBusListenerInfo class 114 and one of three types of an IProvider class 116, a view provider, and I/O provider or a storage provider. Providers are explained below.

The screen represented by IApplicationInfo class 110 corresponds to a group of lines of the control file. In other words, an instance of this class is created in response to the group of lines. Each line of the control file has several columns. Referring to FIG. 7A, note that for example, the first line of the second group of lines from the top (groups being offset from one another by blank lines) includes "App" in the first column, "RootApp.Menu" in the second column, "MainMenu" in the third column and, continuing on FIG. 7B, "com.bonitasoftware.togo.MenuApplication" in the fifth column.

A line with "App" in the first column denotes that the lines that follow correspond to a screen. The second column of such a line is a name for the screen. The third column is a label that is to be displayed on a button or other user interface control of the screen. The fifth column is the name of the application that is to be invoked in response to activation of the user interface control. Some of the lines with "App" in the first column further include an item in the sixth column that relates to the concept of providers, described below.

A line with "Command" in the first column defines the method that is to be invoked in response to a command. ICommandInfo class 112 corresponds to such a line. The second column of such a line is again the screen name, and the third column is again the user interface control label. The fourth column is the address or content 94 of a content holder 86, 88, 90, etc. (See FIG. 8.) In this exemplary control file, the lines beginning with "Command" in the second group of lines have "StartApplicationInfoName" in the fourth column, indicating the address of content holder 90, as described above. As described above, content holder 90 is the special one that responds by invoking a JAVA method 98 associated with a different application than the application that had been executing. The fifth column is the value to be stored in content 94. As described above, framework 24 responds to a change in the value stored in content 94 of content holder 90 by invoking a JAVA method having a name that is the value. Thus, for example, in accordance with the second line of the second group in the exemplary control file of FIGS. 7A–B, activating a button on the main menu (i.e., a screen) labeled "LDAP" is to cause the value "RootApp.LDAPSearch" to be stored in content 94 (i.e., the address "StartApplicationInfoName"), resulting in the invocation of a JAVA method 98 named "RootApp.LDAPSearch." This method 98 can cause a screen similar to that of FIG. 6A to be displayed, presenting the user with the first screen of the (LDAP) lookup application program 34.

A line in the control file with "BusListener" in the first column defines a bus address (e.g., name 92) and content 94. (See FIG. 8.) IBusListenerInfo class 114 corresponds to such a line. The second column of such a line is the screen name. The third column is the bus address of bus listener 96. The fourth column is a message that is to be sent to the JAVA method 98 when invoked in the manner described above. Thus, a control file can, for example, define a bus listener 96 that listens to an address "emailaddress" and has associated with it (via a "Command" line) a JAVA method "composemail". Thus, if "COMPOSE" button 80 (FIG. 6B) is activated, such a bus listener 98 responds by invoking "composemail."

As described above, the "StartApplicationInfoName" bus address is created by framework 24 itself as opposed to application program 32, 34, 36, etc. The creator of the control file can use this address to have framework 24 launch another application in response to a button press. The application program-created type of bus address is represented by bus listener name 92. With regard to the exemplary control file of FIGS. 7A–B, the bus address "previousButton" (FIG. 7A) refers to LDAP application program 34. In creating application program 34, the programmer defines one of bus listeners 96 (in the program code) and develops a method to be called in response to a change in content of the "previousButton" address. The control file illustrated in FIGS. 7A–B is intended only as an example. The functions of which a control file is capable are not limited to those discussed above. Much more that will occur readily to persons of skill in the art can be done in view of the above descriptions of creating user interface controls using the "Command" line, creating bus addresses using the BusListener line, using the bus addresses created by framework 24 or application programs 32, 34, 36, etc., and supplying content 94 (which can be a message, a command or data) at the address.

Other lines in the control file include those having "Name," "Root" or "Start" in the first column, as in the first three lines of the exemplary control file shown in FIGS. 7A–2B. The name is used to identify a control file. It is contemplated that control files be made commercially available along with application programs. For example, a person can maintain installed on his device 26 a control file relating to a set of installed application programs, i.e., an application suite, and later install a different control file (of a different name) and different application suite. A "Root" line identifies an application program that begins executing upon startup. A "Start" line identifies the initial screen upon startup.

IProfile class 118 refers to both an IApplication class 120 and IApplicationInfo class 110, which in turn refer to each other. IProfile Class 118 reads a list (not shown) of installed application programs at startup so that the list can be displayed for the user as a menu from which to select. An object of IApplication Class 120 is instantiated when a user selects from the list one of the applications to run.

IApplicationInfo class 110 is the class that reads in the part of the control file associated with the screen and makes available the appropriate user interface controls associated with IView class 122. IView class 122 has associated with it GUI element classes 124. Classes 124 are platform-specific and thus included in plug-in 30 (FIG. 2), but the others are platform-independent. Classes 124 define the platform characteristics, such as whether the GUI has soft, i.e., graphical, buttons or hard, i.e., actual hardware, buttons, or some other input mechanism, how the input and output mechanisms are used, how many there are, how they are arranged, and any other characteristic that affects how an application program can interface with a user. GUI element classes 124 are platform-specific classes to which an application programmer can interface application programs 32, 34, 36, etc. In addition, an IApplicationInfoState class 126 maintains the state of the application (i.e., installed, uninstalled, instantiated, initialized, started, stopped, etc.)

Figure 12:
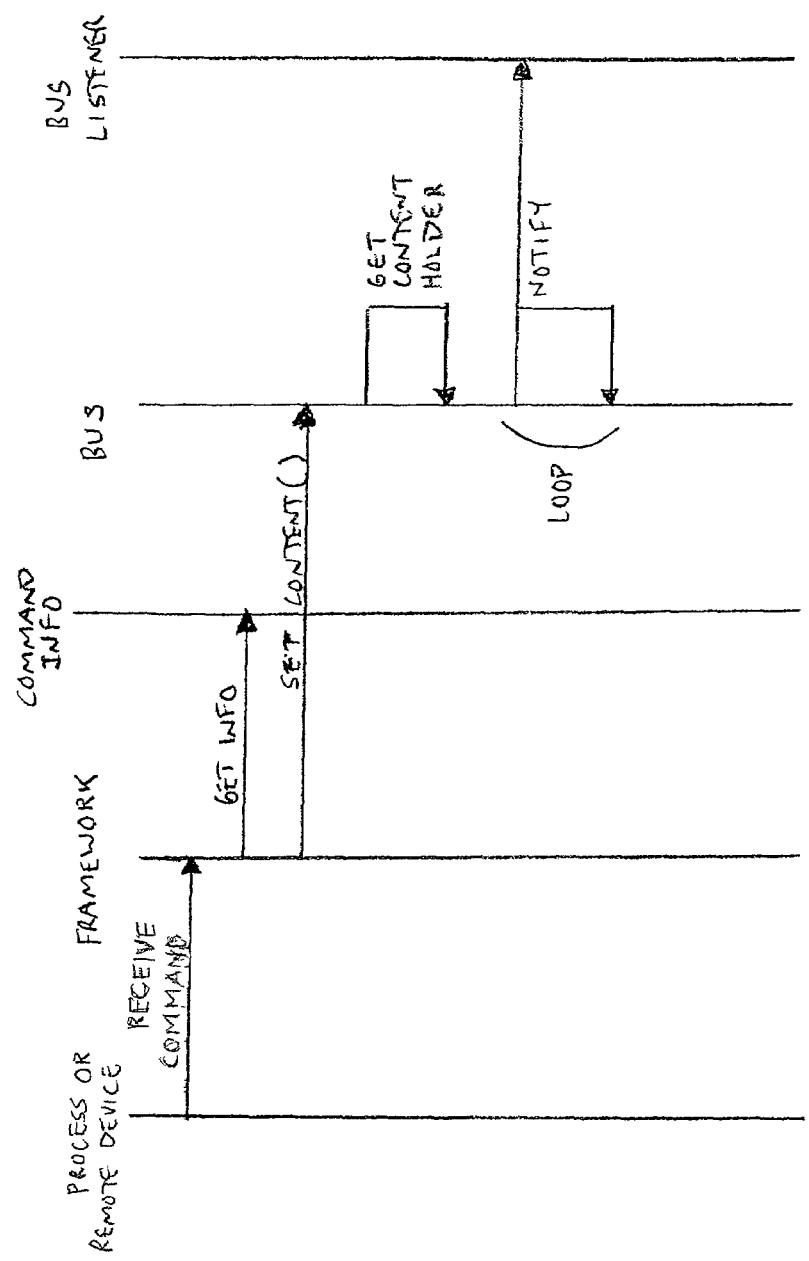
FIG. 12 is a sequence diagram similar to FIG. 9 illustrating the sequence of events with respect to the operation of the bus in response to a command received from a remote device.

As illustrated by the sequence diagram of FIG. 12, framework methods or, alternatively, application program methods, can respond to commands received from other application program methods or similar processes and from remote devices (e.g., remote device 43 in FIG. 4) in the same manner as they can respond to commands associated with activation of a button or other user interface control (see FIG. 9). That is, with reference to FIG. 8, one of content holders 86, 88, 90, etc. detects that the value stored in its address or content 94 has changed and, in response, notifies each of its one or more bus listeners 96. Each of bus listeners 96 has an address and a JAVA method 98 associated with it. In response to the notification, each bus listener calls or invokes the JAVA method 98 associated with it.

It is important to note that bus 84 can cause methods 98 to be performed in response to the writing of an address by methods 100 regardless of the source of methods 100. For example, although methods 100 can be associated with button activations as described above with regard to FIG. 9, they can alternatively be associated with other application programs or similar processes in device 26 or with remote devices 43 (FIG. 4). From the perspective of bus 84, neither the identity nor physical location of the process or device writing to bus 84 is relevant. In some embodiments of the invention, methods 100 can be within device 26, such as programs or other processes that are to be monitored. In such embodiments, methods 98 perform the monitoring functions. In this manner, network usage, program usage and other activities can be monitored and reported to a remote service provider or used in some other manner. In other embodiments, methods 100 can be external to device 26, such as programs that remotely cause device 26 to install a program, uninstall a program, initialize a program, enable a program, disable a program, update a program, configure a program or replace a program. In such embodiments, methods 98 can perform these functions. Because such programs or methods 98 are well-known to persons of ordinary skill in the art, they are not described in detail in this patent specification. It is important to note that a remote device can invoke essentially any method associated with any program in device 26.

The remote device can be similar to device 26 or other hand-held wireless device, or it can be more like a server. A service provider can thus, for example, remotely install application programs, monitor usage of device 26, its programs or other activities (e.g., record number of keystrokes, number of messages, etc.), enable and disable installed programs, change user settings, add and remove commands, and perform any of the other above-referenced operations, all without assistance of the user of device 26. A service provider or other remote entity can invoke via the wireless interface essentially any method that a user of device 26 could invoke via the user interface.

Figure 13:
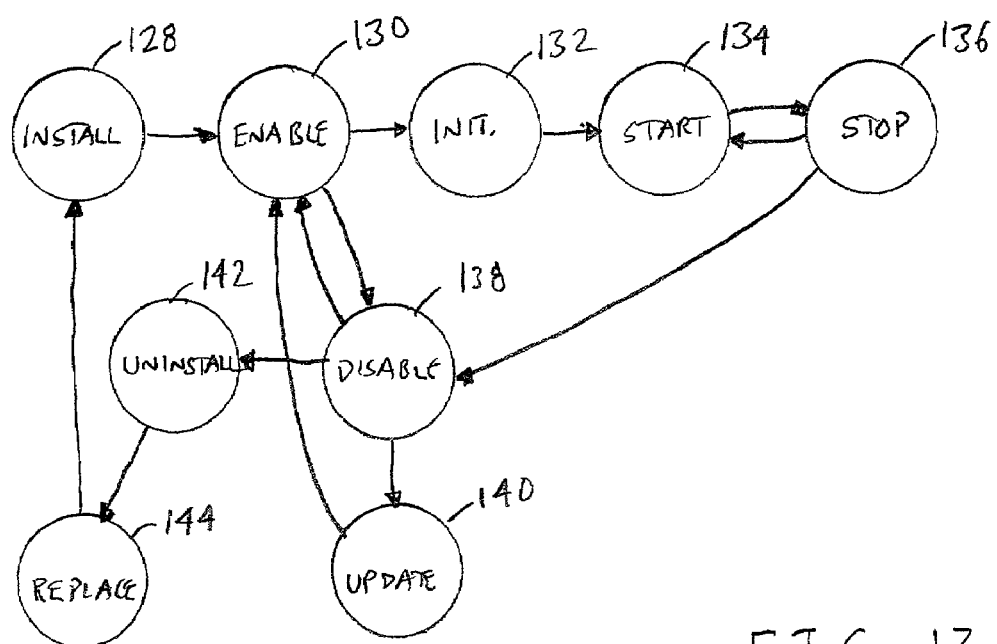
FIG. 13 is a state diagram illustrating the remote management of an application throughout its life cycle.

As illustrated in FIG. 13, a service provider or other remote entity can manage application programs in their subscribers' devices throughout the application program life cycle. For example, by remotely issuing a command to device 26, the service provider can remotely install a program (entering installed state 128). That is, the service provider can remotely add a program 32, 34, 36, etc. (FIG. 2) to device 26 by invoking an installation manager or other conventional mechanism for installing application programs in a wireless device. Once the application has been installed, the service provider can remotely enable it (entering enabled state 130), i.e., make is available to the user. The service provider can then remotely initialize an enabled program (entering initialized state 132), i.e., allocate storage space, network access or other resources in preparation for running or executing the program. The service provider can remotely run an initialized program (entering a start state 134) and stop a running program (entering a stop state 136). Similarly, the service provider can remotely disable a program (entering disabled state 138). The service provider can remotely update a program (entering update state140), i.e., remotely alter or change the program. The service provider can remotely uninstall a program (entering uninstall state 142). The service provider can alternatively remotely replace a program (entering replace state 144) if, for example, a new version of the program is released. The actions represented by the states shown in FIG. 3 and the paths between them are intended only as examples of how a remote entity can control an application program throughout its life cycle, and other actions and paths will occur readily to persons of skill in the art in view of the above teachings.

The present invention provides a mechanism for invoking software methods in response to any remote device, any application program or similar process in the device itself, or anything else that can write an address to the software bus. Remote entities, such as providers of services to which a user of a wireless device subscribes, can perform many of the tasks remotely that they conventionally required physical access to the device to perform, such as enabling and disabling programs and changing user settings.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method for managing application programs in a digital electronic device, the method comprising the steps of:

storing, on the electronic device, an application set and an associated control file, wherein the application set includes at least one application comprising a plurality of object methods, wherein the control file integrates a plurality of applications in the application set such that more than one application can execute on the electronic device concurrently, and transparently to a user of the electronic device;

creating a plurality of bus listener objects in an object framework of the device;

defining a plurality of bus addresses, each corresponding to one and only one of the plurality of bus listener objects;

receiving a value from a process;

writing the value in a bus address; and a bus listener object to which the bus address corresponds responding to a change in value stored in the bus address by invoking an object method associated with the address, wherein a plurality of relationships between the plurality of bus listener objects, the plurality of bus addresses, and a plurality of object methods is defined by the control file.

2. The method claimed in claim 1, wherein the step of receiving a value comprises wirelessly receiving an activation signal from a remote source, the activation signal including a representation of a value.

3. The method claimed in claim 1, wherein the step of receiving a value from a process comprises receiving a value from an application program method in the device.

4. The method claimed in claim 1, wherein the step of receiving a value from a process comprises receiving a value from a framework method in the device.

5. The method claimed in claim 1, wherein the step of creating a plurality of bus listener objects is performed in response to a control file specifying the bus address and corresponding method associated with the bus address of each bus listener.

6. The method claimed in claim 1, wherein the object framework is a software layer between an application program layer and a platform layer.

7. The method claimed in claim 6, wherein the object method is of an application program.

8. The method claimed in claim 6, wherein the object method is of the framework.

9. The method claimed in claim 8 wherein the object method runs an application program.

10. The method claimed in claim 8 wherein the object method installs an application program.

11. The method claimed in claim 8 wherein the object monitors application program usage.

12. The method claimed in claim 8 wherein the object method enables an application program.

13. An electronic device, comprising:
a memory in which is storable an object framework and a plurality of application programs, the object framework comprising:
an application set comprising a plurality of application programs; and
an associated control file, wherein the control file integrates the plurality of applications in the application set such that more than one application can execute on the electronic device concurrently, and transparently to a user of the electronic device; and
a processing system programmed to effect a method using the object framework comprising the steps of:
creating a plurality of bus listener objects;
defining a plurality of bus addresses, each corresponding to one and only one of the plurality of bus listener objects;
receiving a value from a process;
writing the value in a bus address; and
a bus listener object to which the bus address corresponds responding to a change in value stored in the bus address by invoking an object method associated with the address, wherein a plurality of relationships between the plurality of bus listener objects, the plurality of bus addresses, and a plurality of object methods is defined by the control file.

14. The device claimed in claim 13, wherein the processing system includes a wireless network interface that receives the value wirelessly from a remote source.

15. The device claimed in claim 13, wherein the processing system receives a value from an application program.

16. The device claimed in claim 13, wherein the processing system receives a value from a framework method in the device.

17. The device claimed in claim 13, wherein the processing system creates the plurality of bus listener objects in response to a control file specifying the bus address and corresponding method associated with the bus address of each bus listener.

18. The device claimed in claim 13, wherein the object framework is a software layer between an application program layer and a platform layer.

19. The device claimed in claim 18, wherein the object method is of an application program.

20. The device claimed in claim 18, wherein the object method is of the framework.

21. The device claimed in claim 20, wherein the object method runs an application program.

22. The device claimed in claim 20, wherein the object method installs an application program.

23. The device claimed in claim 20, wherein the object method monitors application program usage.

24. The device claimed in claim 20, wherein the object method enables an application program.

* * * * *